United States Patent
Lopes

(10) Patent No.: US 9,440,804 B2
(45) Date of Patent: Sep. 13, 2016

(54) SYSTEM OF UNLOADING BULK MATERIAL

(71) Applicant: VALE S.A., Rio de Janeiro (BR)

(72) Inventor: Bruno Eduardo Lopes, Maranhão (BR)

(73) Assignee: VALE S.A., Rio de Janeiro (BR)

( * ) Notice: Subject to any disclaimer, the term of this patent is extended or adjusted under 35 U.S.C. 154(b) by 128 days.

(21) Appl. No.: 13/908,832

(22) Filed: Jun. 3, 2013

(65) Prior Publication Data

US 2013/0322995 A1 Dec. 5, 2013

Related U.S. Application Data

(60) Provisional application No. 61/655,350, filed on Jun. 4, 2012.

(51) Int. Cl.
  *B65G 65/00* (2006.01)
  *B65G 47/19* (2006.01)
  *B65G 65/42* (2006.01)

(52) U.S. Cl.
  CPC ............. *B65G 65/005* (2013.01); *B65G 47/19* (2013.01); *B65G 65/42* (2013.01)

(58) Field of Classification Search
  CPC ..... B65G 65/005; B65G 65/42; B65G 47/19
  USPC ....... 414/328, 329, 288, 289, 294, 299, 298, 414/300–303, 306–308; 222/52, 63, 181.1, 222/181.2
  See application file for complete search history.

(56) References Cited

U.S. PATENT DOCUMENTS

| | | | | |
|---|---|---|---|---|
| 3,062,355 A | * | 11/1962 | Sawada | 198/635 |
| 3,724,720 A | * | 4/1973 | Bullivant | 222/55 |
| 3,897,868 A | * | 8/1975 | Smith, Jr. | 222/55 |
| 3,929,173 A | * | 12/1975 | Mauroner | 141/74 |
| 4,475,669 A | * | 10/1984 | Wahl | G01G 11/12 177/121 |
| 4,737,062 A | * | 4/1988 | Mathewes | 414/288 |
| 4,948,322 A | * | 8/1990 | Kunstmann | 414/300 |
| 5,004,400 A | * | 4/1991 | Handke | 414/808 |
| 5,859,780 A | * | 1/1999 | Pearson | 700/240 |
| 6,581,778 B1 | * | 6/2003 | Kato et al. | 209/21 |
| 6,966,506 B2 | * | 11/2005 | McLeod et al. | 241/79.1 |
| 7,008,163 B2 | * | 3/2006 | Russell | 414/306 |
| 7,411,136 B2 | * | 8/2008 | Walker | 177/121 |
| 7,513,280 B2 | * | 4/2009 | Brashears et al. | 141/104 |
| 7,905,357 B2 | * | 3/2011 | Svatek et al. | 209/246 |
| 7,946,796 B2 | * | 5/2011 | Halland et al. | 414/299 |
| 7,980,803 B2 | * | 7/2011 | Brandstatter et al. | 414/293 |
| 8,534,452 B2 | * | 9/2013 | Furuyama et al. | 198/532 |
| 2003/0103837 A1 | * | 6/2003 | Kokeisl | 414/288 |
| 2003/0156929 A1 | * | 8/2003 | Russell | 414/306 |
| 2008/0292447 A1 | * | 11/2008 | Brandstatter et al. | 414/808 |
| 2010/0070073 A1 | * | 3/2010 | Foley et al. | 700/240 |
| 2013/0186515 A1 | * | 7/2013 | Kleiner et al. | 141/12 |
| 2013/0292228 A1 | * | 11/2013 | Webb | 198/459.5 |
| 2013/0292407 A1 | * | 11/2013 | Beavis et al. | 222/1 |
| 2014/0044507 A1 | * | 2/2014 | Naizer et al. | 414/288 |

* cited by examiner

*Primary Examiner* — Kaitlin Joerger

(74) *Attorney, Agent, or Firm* — Arent Fox LLP

(57) ABSTRACT

The present invention pertains to a system of unloading bulk material that comprises at least a silo for receiving a bulk load discharged from a load transport means; and at least a feeder to feed the load from the silo to a conveyor belt. The system comprises a flow control means that regulates the operating parameters of the feeder to make sure that an estimated calibrated flow rate corresponds to a desired flow rate, where the estimated calibrated flow rate is obtained based on a calibration factor calculated by comparing an estimated flow based on an operating parameter of the feeder with a real flow measured downstream of the silo.

8 Claims, 7 Drawing Sheets

SYSTEM OF UNLOADING BULK MATERIAL

CROSS-REFERENCED TO RELATED APPLICATIONS

This application is based upon and claims priority to Provisional Application No. 61/655,350, filed Jun. 4, 2012, the disclosure of which is hereby incorporated in its entirety by reference.

FIELD OF THE INVENTION

The present invention pertains to a system of unloading bulk material and, more specifically, to an unloading system for car dumpers.

BACKGROUND OF THE INVENTION

Equipment to assist the unloading of railway cars by means of tipping structures that turn the car to an unloading angle is known in the art.

This equipment, known as car dumpers, is a large scale structure that locks the car by way of an anchoring system and turns the car around its central axis to an angle of about 160° so that the load falls into silos, directing it to conveyor belts.

Thus, the car dumper unloading system basically comprises the dumper structure, one or more transfer silos, one or more feeders and a conveyor belt. The dumper can be adapted to unload more than one car, such that the quantity of the other components may be correspondingly adapted to the number of cars/quantity of load that will be unloaded.

The use of car dumper unloading systems poses a challenge associated to planning unloading times and speeds. In fact, for the unloading system to operate efficiently, it is necessary for the car dumper discharge flow to correspond to the desired flow for the unloading line or path.

The flow control of car dumpers is usually carried out manually, with operators manually adjusting the speed of the feeders to make sure that the flow obtained is equal to the desired flow for unloading and transporting without incidents.

When two silos are present in the unloading system, it is common for the operator to have to make relative adjustments so that the levels of the silos stay near one another. These adjustments basically comprise increasing or decreasing the difference in speed between the feeders of the two silos until a speed ratio is found that levels the remaining load therein.

Naturally, manual adjustment has various drawbacks. A first unfavorable aspect is the matter of time required for this kind of adjustment, but more important is the loss of productivity deriving from the inconsistency of the flow and also from the possible overload of the feeders.

Objectives of the Invention

Thus, it is one of the objectives of the present invention to provide a system of unloading bulk material that comprises an efficient flow control, decreasing the need for operator intervention and providing increased productivity.

It is another objective of the present invention to provide a system of unloading bulk material that enables an estimated calibrated flow rate to be obtained which best represents the real unloading flow of the system.

It is a further objective of the present invention to provide a system of unloading bulk material that comprises a flow control means that regulates the operating parameters of the feeder to make sure that the estimated calibrated flow rate corresponds to a desired flow rate.

SUMMARY OF THE INVENTION

The present invention achieves the above objectives by means of a system of unloading bulk material that comprises at least a silo for receiving a bulk load discharged from a load transport means and at least a feeder to feed the load from the silo to a conveyor belt. The load transport means is preferably a car dumper, and the system comprises a flow control means that regulates the operating parameters of the feeder to make sure that an estimated calibrated flow rate corresponds to a desired flow rate, where the estimated calibrated flow rate is obtained based on a calibration factor calculated by comparing an estimated flow based on an operating parameter of the feeder and a real flow measured downstream of the silo.

In the preferred embodiment of the present invention, the flow control means is a controller that adjusts the speed of each of the feeders to make sure that the estimated calibrated flow rate corresponds to a desired flow rate; the real flow measured is obtained from a scales disposed on the conveyor belt at a point downstream of the silo, and the unloading system comprises two feeders and two silos.

Further in the preferred embodiment, the estimated flow rate is obtained based on the current and speed of the feeders, based on the following equation:

$$y(t)=(a1*u1(t))+a2*v1(t))+a3*u2(t))+a4*v2(t));$$

where y=estimated flow, $u_1$=Current of the first feeder, $v_1$=Speed of the first feeder, $u_2$=Current of the second feeder, $v_2$=Speed of the second feeder and $a_1$, $a_2$, $a_3$ and $a_4$ are the parameters of the discrete system to be estimated.

The system of the present invention may further comprise a means of controlling the level so as to enable the load levels in the silos to be near one another. The control means may be manual or automatic.

In the manual control means, the manual adjustment of a speed difference between the feeders is enabled.

The automatic control means comprises a level transmitter associated to each of the silos, and the very level control means regulates the operating parameters of the feeders based on the load level in the silos.

The unloading system may further comprise a supervision interface for adjusting and accompanying the operating parameters of the system.

DETAILED DESCRIPTION OF THE INVENTION

Figure 1:
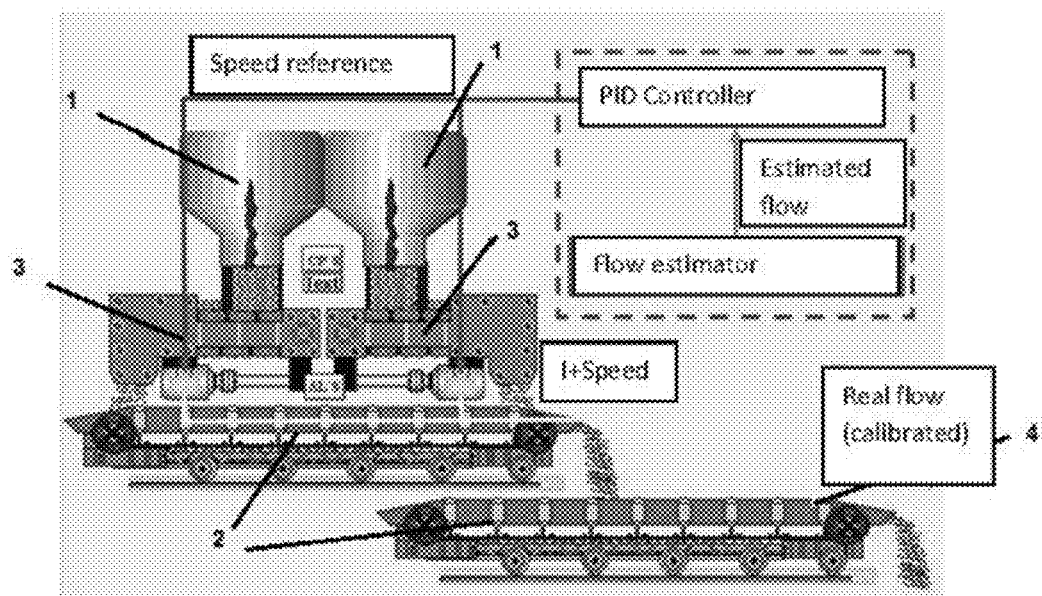
FIG. 1 illustrates a schematic view of an unloading system according to a preferred embodiment of the present invention.

The present invention will now be described in greater detail based on an example of execution represented in the drawings.

FIG. 1 shows an unloading system of car dumpers according to a preferred embodiment of the present invention. In this embodiment, the system comprises two silos 1 which receive the load from the car that is turned (not shown). The silos 1 unload the load onto conveyor belts 2 through feeders 3. In the embodiment illustrated, each silo 1 is connected to a feeder 3. In the preferred embodiment of the invention, the feeders 3 are apron feeders.

The unloading system of the present invention controls the discharge flow based on an estimated calibrated rate for the material flow in the output of the feeders 3. To establish this calibrated rate, the system performs the calculation based on the information on the discharge speed and the real flow measured at a point downstream of the discharge path, and compares the estimated flow with the flow measured to reach a correction factor/calibration.

The use of the estimated calibrated rate visa eliminates a problem known as delay time or dead time which is inherent to flow measurements dependent on time. This dead time is caused by the inconsistency resulting from the delay time between the discharge point (dumper) and the flow measurement site.

In the preferred embodiment of the present invention, the system performs the calculation based on information received from the feeders and from a scales positioned at a point downstream of the unloading system (that is, from a scales installed at a point downstream of the conveyor belt 2—see reference 4 in FIG. 1).

Thus, in the preferred embodiment of the present invention the system acquires data on current and speed of the feeders 3 to calculate the estimated discharge flow y.

Accordingly, the data on current and speed of the feeders are applied in a mathematical model given by the equation 1 below $$y(t) = (a_1 * u_1(t)) + a_2 * v_1(t)) + a_3 * u_2(t)) + a_4 * v_2(t));  \quad (1)$$

where y=estimated flow, $u_1$=Current of the first feeder, $v_1$=Speed of the first feeder, $u_2$=Current of the second feeder, $v_2$=Speed of the second feeder and $a_1$, $a_2$, $a_3$ and $a_4$ are the parameters of the discrete system to be estimated.

To obtain the data on current and speed, the motors of these apron feeders are controlled by drives, such as frequency inverters or converters. The information on speed and current of the feeders are sent to the CLP by the drive itself. So that the drive manages to calculate the real speed of the feeder it will be necessary to couple encoders or tachogenerators to the motor and integrated to the drive.

The above model is a linear ARX model, the concepts of which are well demonstrated in Aguirre [Aguirre, L. A., 2007. *Introdução a Identificação de Sistemas. Técnicas Lineares and Não Lineares Aplicadas a Sistemas Reais*. Editora UFMG, Belo Horizonte—MG. Brazil, $3^{rd}$ edition and Aguirre, L. A., 2000. *A nonlinear dynamical approach to system identification*, IEEE Circuits & Systems Society Newsletter 11(2): 10-23,47]. The Autovalues Analysis Method for linear models, created by Lopes et al. (2010) [Lopes, B. and, Corrêa, M. V., Teixeira, R. A. and Moura, J. P., 2010 was used to determine the order of the model. *Método de Análise dos Autovalores para seleção de ordem de modelos lineares*. Anals of the $18^{th}$ Brazilian Automatics Congress, Bonito MS, pages 498-504]. The full content of the above publications is incorporated herein by reference.

Figure 2:
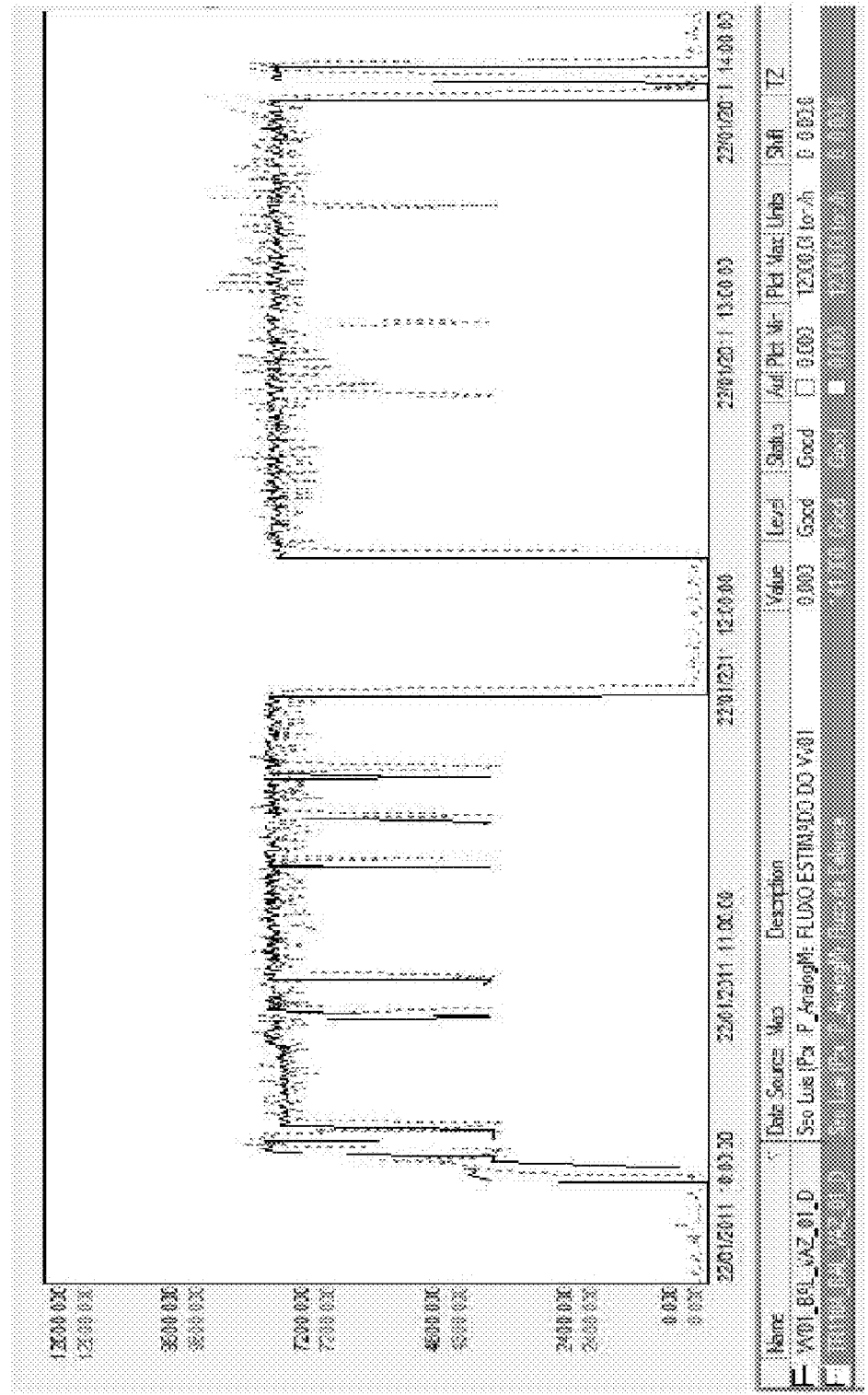
FIG. 2 illustrates a graph that compares the estimated flow obtained based on operating parameters of the feeders of the unloading system according to a preferred embodiment of the present invention and a real flow measured in the unloading system.

FIG. 2 shows a comparison between the estimated flow y and the real flow. The drawing shows that the estimated flow is a reasonable representation of the real flow.

The estimated flow y values are then compared with the FM flow data measured on the scales to establish a correction factor that will be applied to the estimated flow y.

To calculate the calibration factor, the estimated flow is divided by the real flow (informed by the scales). It is important that this division is performed in a same time base, in other words, the estimated flow is calculated and this information is stored, when the estimated flow calculated passes through the scales, the two flows are then compared in order to calculate the calibration factor.

Figure 3:
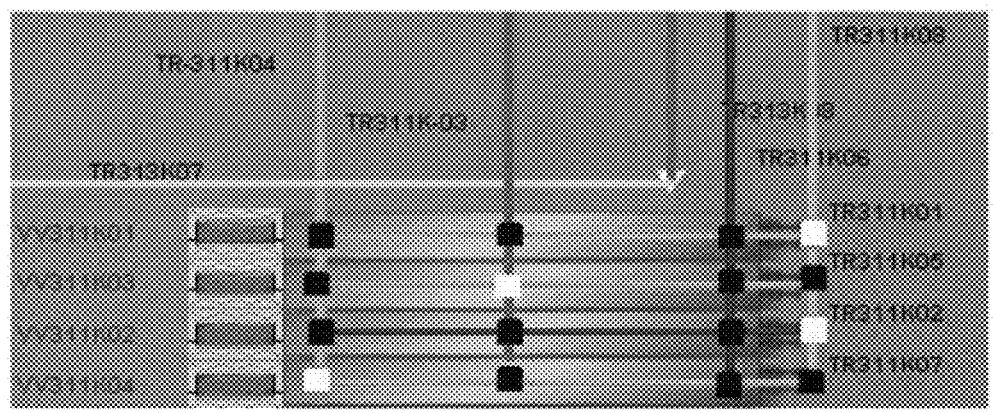
FIG. 3 illustrates an example of a plant where the unloading system of the present invention may be applied.
Figure 4:
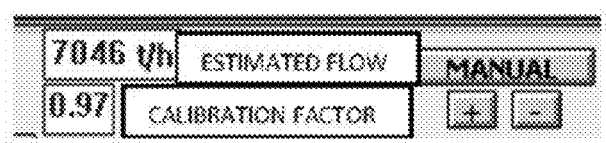
FIG. 4 shows an example of a screen of a supervision interface that is part of the unloading system according to a preferred embodiment of the present invention.
Figure 5:
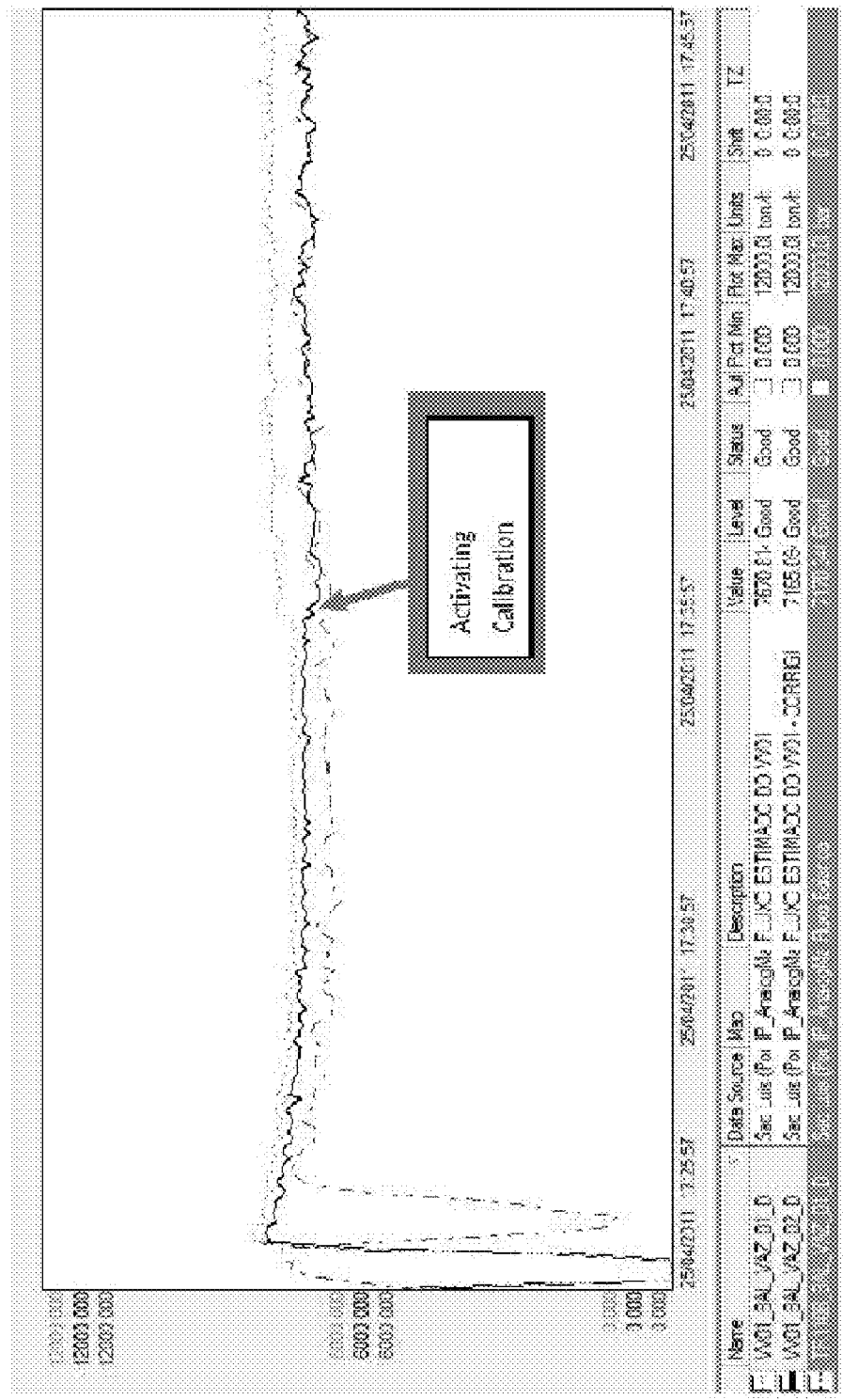
FIG. 5 illustrates a comparative graph between an estimated calibrated flow rate of the unloading system according to a preferred embodiment of the present invention, the estimated flow obtained based on operating parameters of the feeders of the unloading system and the real flow measured in the unloading system.

FIGS. 3 to 5 show an example of how the correction factor may be applied in a real operating situation.

FIG. 3 shows an example of plant having 4 car dumpers and 4 four unloading lines 6.

In order to obtain an estimated corrected (calibrated) value for each of the dumpers 4, the following information must be known:

which car dumper is operating for a certain unloading line; and the delay time between the car dumper and the scales downstream which will measure the real flow;

For the operator to have control over the operation of the system, a supervision interface may be provided to inform the correction factor applied and to enable the operator to activate or deactivate the correction. FIG. 4 shows an example of the screen of such supervision interface.

FIG. 5 shows a comparative graph between the estimated flow y calculated based on the information from the feeders 3, the FM flow measured on the scales, and the estimated calibrated/corrected FC rate with the calibration factor. As can be seen in this figure, the estimated calibrated rate FC is an entirely appropriate representation of the real flow.

The system of the present invention uses the estimated calibrated rate FC to control the output flow from the feeders 3. Hence, the system further comprises a controller (preferably, a PID controller) which computes a desired flow rate FD informed by the operator and adjusts the speeds of the feeders 3 to make sure that the estimated calibrated rate FC is equal to the desired flow rate FD.

The system of the present invention may further comprise a means of adjusting the level of silos, to make sure that the load level in each of the silos 1 is near one another.

The adjustment means may be a manual adjustment or an automatic adjustment.

In the manual adjustment, the operator may adjust the speed difference between the feeders through a corresponding input in the supervision interface. In the automatic adjustment, the very system automatically controls the level in the silos 1.

Thus, to carry out the automatic level control, the system further comprises a level transmitter associated to each of the silos 1, and the transmitter verifies the material unloaded by each car.

This check is made with the use of a Radar type sensor, manufactured by Indurad. This sensor monitors the level of the silo and sends the information on the level to the CLP through an analogical input (4~20 mA).

The transmitter informs the level of each silo 1 to a monitoring means and the system controls the level in the silos by reducing the speed of the feeders, of the deactivation of the feeders and of the blockage of the discharge from the dumper.

The level control adheres to the following logical principal:
- If the transmitter informs a low level in the silo: the system deactivates the flow control and reduces the speed of the feeders;
- If the transmitter informs a very low level in the silo: the system deactivates the flow control and turns off the feeders;
- If the transmitter informs a very low level in the silo: the system deactivates the flow control and turns off the feeders; and
- If the transmitter informs a very high level in the silo: the system keeps the flow control activated and blocks the discharge from the dumper, preventing more load from being discharged into the silo.

Thus, the system of the present invention is capable of regulating the speed in the feeders 3 to maintain the desired FD discharge flow and, at the same time, keeps the levels in the silos 1 near one another.

Figure 6:
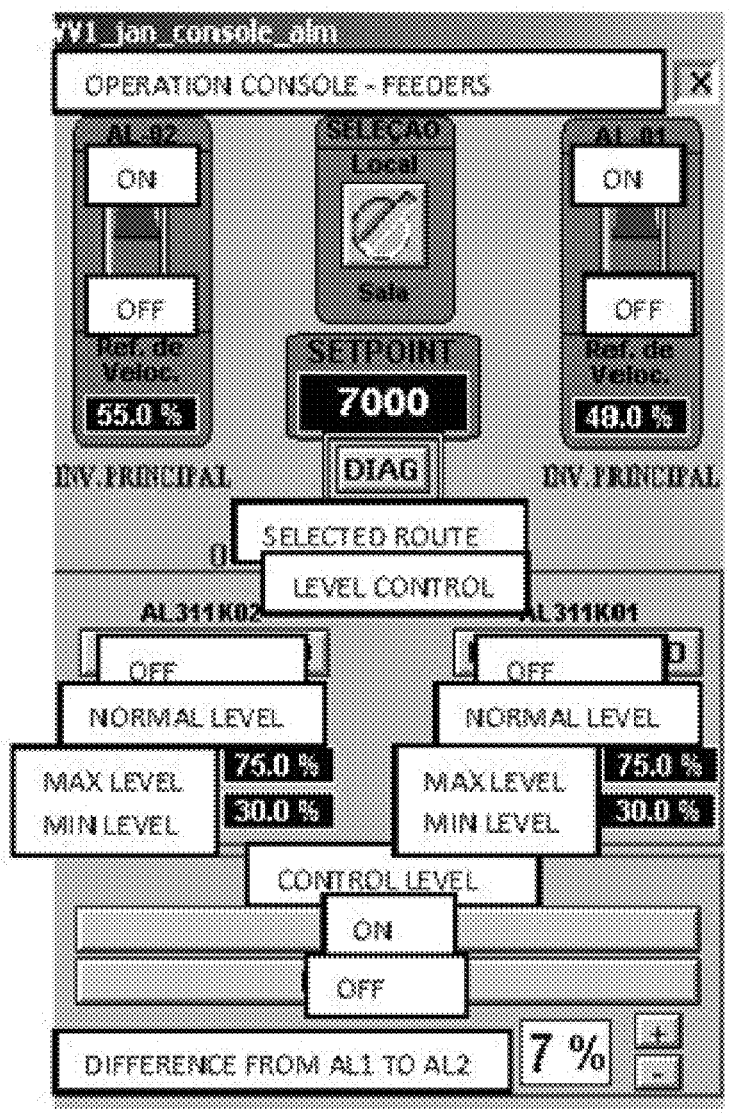
FIG. 6 shows an example of the supervision interface that is part of the preferred embodiment of the present invention.
Figure 7:
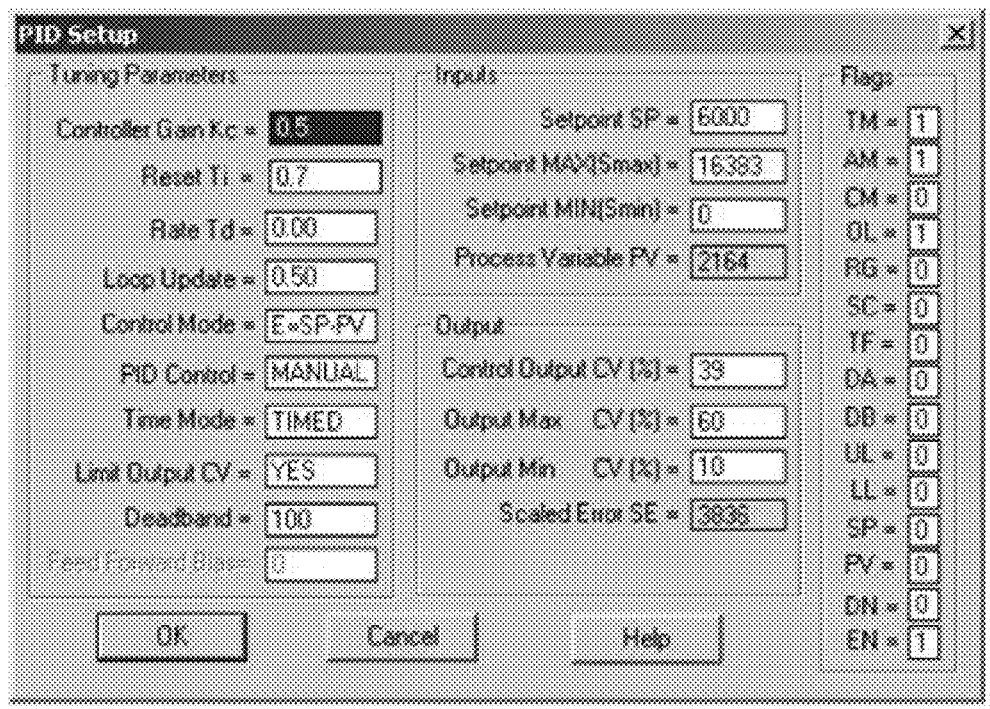
FIG. 7 shows an interface with the main operating parameters of the controller that is part of the preferred embodiment of the present invention.

FIGS. 6 and 7 show examples of an interface of a preferred embodiment of the system of the present invention.

FIG. 6 shows an example of the supervision interface that is part of the preferred embodiment of the present invention.

As can be seen in this figure, the interface comprises a feeder regulation section which indicates the relative speed of each feeder and the desired FD flow for the system (SETPOINT). This section further comprises switches to activate and deactivate the feeders—marked as AL-01 and AL-02 —, according to the need of the system (for example, in the case of a very low load level in the silos).

The supervision interface further comprises a level control section, which monitors the level in each silo, according to maximum and minimum levels pre-established by the operator. The level control may be activated or deactivated for each of the silos, as shown by the corresponding keys present in the figure.

The flow control can be activated or deactivated by driving the interface keys. As mentioned previously, the deactivation of the flow control may be advisable for regulating the level in the silos.

FIG. 7 shows an interface with the main operating parameters of the controller. The PID controller used is the standard of the CLP SLC 500 of Rockwell. This PID controller is responsible for controlling the speed of the feeders with the aim of making sure that the estimated calibrated flow (Process Variable—PV) is equal to the flow desired by the operator (Setpoint—SP).

Figure 8:
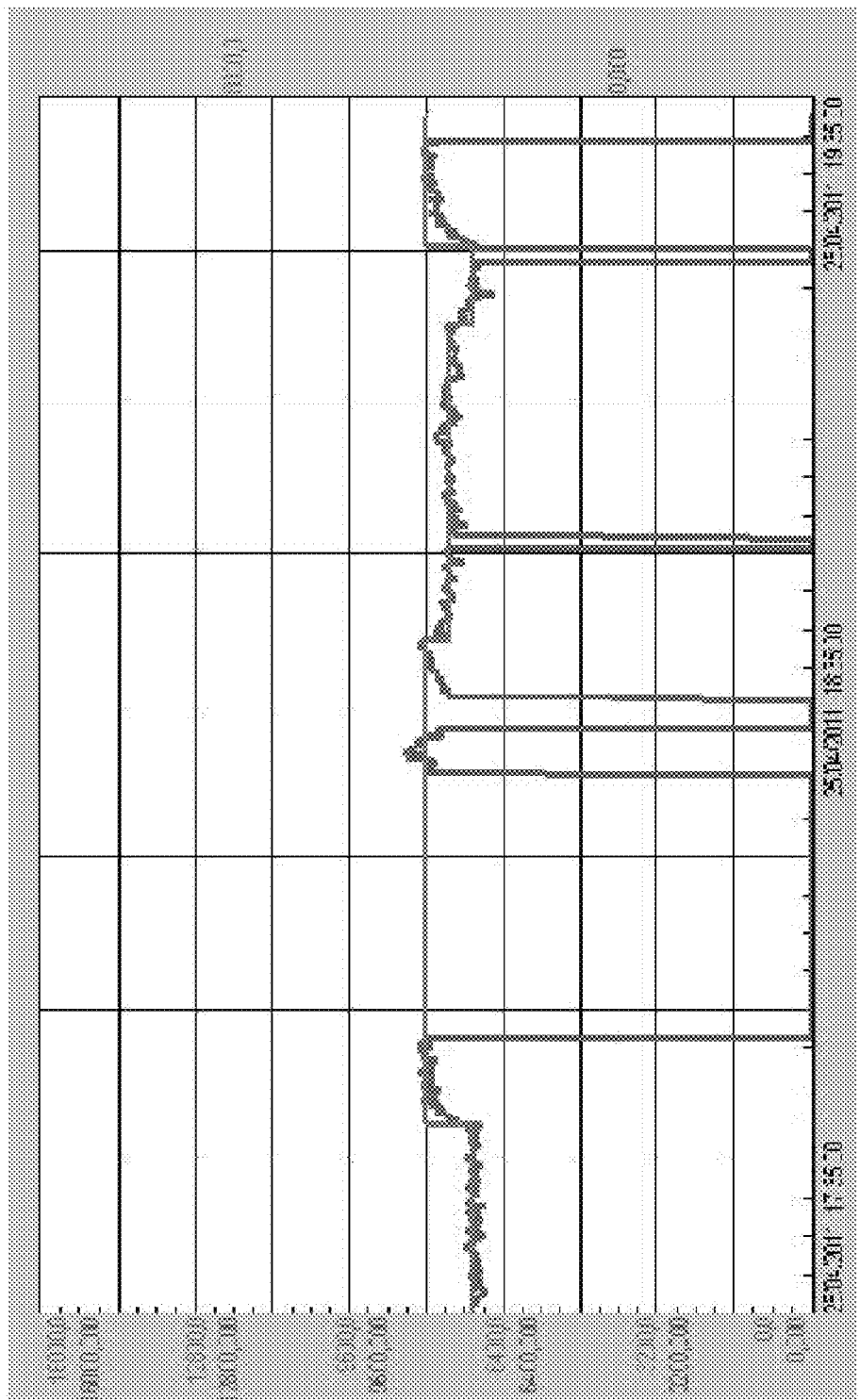
FIG. 8 shows a graph with the performance of an unloading control system in accordance with a preferred embodiment of the present invention.

FIG. 8 shows the performance of a discharge control system in accordance with a preferred embodiment of the present invention. The graph specifically shows the change of the estimated corrected flow for each desired flow rate selected by the operator. As can be seen in the drawing, the control system of the present invention is capable of quickly adjusting the speed of the feeders to make sure that the estimated calibrated FC flow corresponds to the desired flow FD.

Table 1 shows an exemplary result of implanting the control system disclosed in the present invention, where SD is standard diversion and CpK is the flow variability.

TABLE 1

| Gains obtained by implanting the system | | | | |
|---|---|---|---|---|
| Month | Average rate (ton/h) | SD (ton/h) | CpK | Flow control? |
| April | 7,698 | 312 | 0.21 | No |
| May | 7,866 | 192 | 0.64 | Yes |
| June | 7,859 | 170 | 0.70 | Yes |
| July | 7,894 | 154 | 0.85 | Yes |

Comparing the month of April with the month of July it can be noted in table 1 that there is a reduction of 49% in the Standard Diversion (SD) of the rate and a reduction of 404% in the variability (CpK).

Lastly, it must be understood that the drawings show one preferred embodiment of the unloading system of the present invention, and the real scope of the object of the invention is defined in the accompanying claims.

The invention claimed is:

1. A system of unloading bulk material, comprising:
at least one silo for receiving a bulk load discharged from a load transport device;
at least one feeder to feed the load from the at least one silo to a conveyor belt; and
a flow control device that regulates one or more operating parameters of the at least one feeder to make sure that an estimated calibrated flow rate corresponds to a desired flow rate;
wherein the estimated calibrated flow rate is obtained based on a calibration factor calculated by comparing an estimated flow based on the one or more operating parameters of the at least one feeder with a measured flow rate measured downstream of the at least one silo;
wherein the at least one feeder comprises a plurality of feeders; and
wherein the estimated flow is obtained based on a current and a speed of the plurality of feeders, based on the following equation:

$$y(t)=(a1*u1(t))+a2*v1(t))+a3*u2(t))+a4*v2(t));$$

where y=estimated flow, u1=current of a first feeder of the plurality of feeders, v1=speed of the first feeder, u2=current of a second feeder of the plurality of feeders, v2=speed of the second feeder and a1, a2, a3 and a4 are the parameters of the system to be estimated.

2. The unloading system of claim 1, wherein the flow control device is a controller that adjusts the speed of each of the at least one feeder to make sure that the estimated calibrated flow rate corresponds to a desired flow rate.

3. The unloading system of claim 1, further comprising at least one scale, wherein the measured flow rate is obtained from the at least one scale disposed on the conveyor belt at a point downstream of the at least one silo.

4. The unloading system of claim 1, wherein the at least one silo comprises a plurality of silos and further comprising at least one level control mechanism to enable each respective load level in the plurality of silos to be near the same level.

5. The unloading system of claim 4, wherein the at least one level control mechanism comprises a manual level control which enables manual adjustment of a speed difference between the plurality of feeders.

6. The unloading system of claim 4, wherein the at least one level control mechanism is an automatic level controller comprising a level transmitter associated to each of the plurality of silos, where the automatic level controller is capable of regulating the one or more operating parameters of the plurality of feeders based on each respective load level in the plurality of silos.

7. The unloading system of claim 1, further comprising a supervision interface for adjusting the one or more operating parameters of the system.

8. The unloading system of claim 1, wherein the load transport device is a car dumper.

* * * * *